(12) United States Patent
Loesch et al.

(10) Patent No.: US 12,021,421 B2
(45) Date of Patent: Jun. 25, 2024

(54) ELECTRIC MACHINE AND HYBRID ELECTRIC AIRCRAFT HAVING A FAULT DEVICE CONFIGURED TO CHANGE A MAGNETIC FLUX COUPLING BETWEEN COIL CORES

(71) Applicant: Rolls-Royce Deutschland Ltd & Co KG, Blankenfelde-Mahlow (DE)

(72) Inventors: Christian Loesch, Erlangen (DE); Markus Sons, Nuremberg (DE); Jens Weidauer, Fürth (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 714 days.

(21) Appl. No.: 17/059,558

(22) PCT Filed: May 29, 2019

(86) PCT No.: PCT/EP2019/064040
§ 371 (c)(1),
(2) Date: Nov. 30, 2020

(87) PCT Pub. No.: WO2019/229161
PCT Pub. Date: Dec. 5, 2019

(65) Prior Publication Data
US 2021/0234445 A1 Jul. 29, 2021

(30) Foreign Application Priority Data
Jun. 1, 2018 (DE) .......................... 102018208686.9

(51) Int. Cl.
*H02K 21/02* (2006.01)
*B64C 11/00* (2006.01)
(Continued)

(52) U.S. Cl.
CPC ............ *H02K 21/028* (2013.01); *B64C 11/00* (2013.01); *B64D 27/02* (2013.01); *B64D 27/24* (2013.01);
(Continued)

(58) Field of Classification Search
CPC .... H05K 5/0204; H02K 41/02; H02K 41/031; H02K 41/033; H02K 1/148; H02K 1/12;
(Continued)

(56) References Cited

U.S. PATENT DOCUMENTS 3,967,147 A * 6/1976 Preiser ................... H02K 5/167
310/71
5,838,085 A * 11/1998 Roesel, Jr. ............ H02K 16/00
310/112
(Continued)

FOREIGN PATENT DOCUMENTS

DE 4421594 A1 1/1996
EP 2608371 A2 6/2013
(Continued)

OTHER PUBLICATIONS

JP2015133775A English Translation (2015).*
International Search Report for International Patent Application PCT/EP2019/064040 dated May 29, 2019.

*Primary Examiner* — Maged M Almawri
(74) *Attorney, Agent, or Firm* — Lempia Summerfield Katz LLC

(57) ABSTRACT

The electric machine includes a rotor and a stator, wherein the stator has stator coils, each with a coil core. The electric machine additionally includes an error-recovery device configured to change a magnetic flux coupling of coil cores with one another by a flux conducting element. The hybrid electric aircraft is a hybrid electric airplane, in particular, and the hybrid electric aircraft has such an electric machine.

14 Claims, 12 Drawing Sheets

(51) Int. Cl.
  *B64D 27/02* (2006.01)
  *B64D 27/24* (2006.01)
(52) U.S. Cl.
  CPC ........ *B64D 27/026* (2024.01); *H02K 2213/06* (2013.01)
(58) Field of Classification Search
  CPC ............. H02K 2201/15; H02K 21/028; H02K 2213/06; B64C 11/00; B64D 27/02; B64D 27/24; B64D 2027/026
  USPC ......... 310/12.15, 12.24, 12.05, 12.07, 12.09, 310/12.14, 12.11, 12.02, 12.25, 216.099, 310/216.101, 216.102, 216.103, 68
  See application file for complete search history.

(56) References Cited

U.S. PATENT DOCUMENTS

| | | | | |
|---|---|---|---|---|
| 5,990,590 | A * | 11/1999 | Roesel, Jr. | H02K 7/025 |
| | | | | 310/112 |
| 7,605,503 | B2 * | 10/2009 | El-Rafai | H02K 11/20 |
| | | | | 310/68 C |
| 8,946,966 | B2 * | 2/2015 | Shimizu | H02K 21/028 |
| | | | | 310/191 |
| 9,413,200 | B2 * | 8/2016 | Horisaka | H02K 3/02 |
| 2003/0098660 | A1 * | 5/2003 | Erdman | H02K 29/03 |
| | | | | 310/68 B |
| 2004/0251765 | A1 * | 12/2004 | Dooley | H02K 11/27 |
| | | | | 310/214 |
| 2008/0042509 | A1 * | 2/2008 | Dooley | H02K 11/27 |
| | | | | 310/156.01 |
| 2008/0143207 | A1 * | 6/2008 | Shah | H02K 21/16 |
| | | | | 310/156.08 |
| 2008/0238217 | A1 * | 10/2008 | Shah | H02K 21/12 |
| | | | | 310/156.01 |
| 2008/0238220 | A1 * | 10/2008 | El-Rafaie | H02K 1/12 |
| | | | | 310/48 |
| 2008/0238233 | A1 * | 10/2008 | El-Rafai | H02K 11/20 |
| | | | | 310/152 |
| 2009/0273254 | A1 * | 11/2009 | Heim | H02K 15/12 |
| | | | | 310/195 |
| 2009/0315425 | A1 * | 12/2009 | Zhang | H02K 55/04 |
| | | | | 310/194 |
| 2014/0015351 | A1 * | 1/2014 | Marvin | H02K 9/16 |
| | | | | 310/54 |
| 2014/0247022 | A1 * | 9/2014 | Frauenhofer | H02P 9/02 |
| | | | | 310/198 |
| 2019/0140495 | A1 * | 5/2019 | Gajanayake | F01D 15/10 |
| 2021/0234445 | A1 * | 7/2021 | Loesch | B64D 27/02 |

FOREIGN PATENT DOCUMENTS

| | | |
|---|---|---|
| JP | 2005057941 A | 3/2005 |
| JP | 2013046519 A | 3/2013 |
| JP | 2015133775 A | 7/2015 |

* cited by examiner

ELECTRIC MACHINE AND HYBRID ELECTRIC AIRCRAFT HAVING A FAULT DEVICE CONFIGURED TO CHANGE A MAGNETIC FLUX COUPLING BETWEEN COIL CORES

The present patent document is a § 371 nationalization of PCT Application Serial No. PCT/EP2019/064040, filed May 29, 2019, designating the United States, which is hereby incorporated by reference, and this patent document also claims the benefit of German Patent Application No. 10 2018 208 686.9, filed Jun. 1, 2018, which is also hereby incorporated by reference.

TECHNICAL FIELD

The disclosure relates to an electric machine and to a hybrid-electric aircraft, in particular, a hybrid electric airplane.

BACKGROUND

Electric machines, (e.g., electric motors and electric generators), have to be used in a particularly operationally reliable manner in some critical applications. For example, measures which reliably prevent failure of the electric machine have to be taken at regular intervals. A particularly critical field is aviation in which electric machines may increasingly be used in the future. In the event of a fault or failure of the machine, excessive overheating or development of a fire constitute a risk that has to be avoided at all cost for this intended application.

Failures of the machine may be caused, for example, by mechanical faults. However, faults in the insulation system may also lead to electrical short circuits. Depending on the location of a short circuit of this kind, short circuits of this kind have consequences of different severity. Short circuits are limited by the conductor resistance and by the inductance of the short-circuited electric circuit. In the case of a terminal short circuit, for example, in which all turns within the motor are basically intact, the result (depending on the design of the motor) is a short-circuit current which may be in the range of the rated current because the inductance is sufficiently high. This is because the inductance of a winding is proportional to the square of the number of turns. The sufficiently high inductance may therefore effectively limit the short-circuit current when the turns of a winding are intact.

However, if a turn short circuit occurs within the machine itself, for example, in the region of a winding, in particular from one turn to a turn which is directly adjacent to this turn, the inductance, on account of this then few turn to be taken into account, is so low that limiting of the short-circuit current by the inductance cannot take place efficiently. Thermal energy, which is then released as a result of the scarcely limited short-circuit current, may quickly destroy the electric machine and, in aviation applications, endanger the lives of passengers on account of the associated fire hazard and failure of the machine.

SUMMARY AND DESCRIPTION

The object of the disclosure is therefore to create an electric machine and a hybrid-electric aircraft of which the operational reliability is significantly improved. In particular, the electric machine and aircraft may be able to be operated in a more fail-safe manner and/or the risk of fire may be significantly reduced in the event of a fault.

This object of the disclosure is achieved by an electric machine and by a hybrid-electric aircraft, as disclosed herein. The scope of the present disclosure is defined solely by the appended claims and is not affected to any degree by the statements within this summary. The present embodiments may obviate one or more of the drawbacks or limitations in the related art.

The electric machine has a rotor and a stator, wherein the stator has stator coils which each have a coil core. The electric machine additionally includes a fault device configured to change a magnetic flux coupling of coil cores to one another by at least one flux-conducting element. By changing the magnetic flux coupling of the coil cores to one another, the magnetic flux coupling of the stator and rotor may be influenced. Coil cores may serve to guide the magnetic flux of a stator coil in a suitable manner so that the magnetic flux guided by a coil core may efficiently interact with a magnetic field of a rotor. However, as a result of the flux-conducting coupling of coil cores to one another, the magnetic flux may be conducted in such a way that a coil core couples significantly more weakly with magnetic fields caused by the rotor. This is because, on account of the magnetic flux coupling of the coil cores, a magnetic flux may be diverted from one coil core to the next coil core. In particular, the magnetic flux of a coil core may be short-circuited with a further, (e.g., an adjacent), coil core by the magnetic flux coupling, so that at most a significantly weakened magnetic field occurs at the coil cores. Conversely, an alternating magnetic field caused by the rotor is no longer primarily coupled into the coil core with increased flux coupling of the coil cores to one another, but the magnetic flux circuit of magnets of the rotor may advantageously bypass the coils due to the magnetic flux coupling of the coil cores to one another and therefore likewise be short-circuited to a certain extent. As a result of the magnetic flux coupling of coil cores to one another, the coupling of the rotor and the stator may therefore be influenced and, in the event of a fault, reduced by the fault device.

A fault of this kind consists, in particular, in a short circuit of adjacent turns of a winding to one another, which in the electric machines known to date would lead to a fault current that is scarcely limited by the inductance. The magnetic flux couplings of the rotor and stator coils to one another may be reduced as a result of the magnetic flux coupling of the coil cores to one another, so that the magnetic flux may be coupled into a stator coil with a turn short circuit of this kind significantly more weakly and therefore no problematic high fault current has to result on account of the significantly reduced induced voltage.

As a result, the electric machine may be configured to be significantly more operationally reliable and the risk of fire is considerably reduced on account of the fault current that may be controlled.

The electric machine may advantageously also continue to be operated in the event of a fault in a turn of a stator coil without total failure of the entire electric machine. In the event of a short circuit in a stator coil, the rest of the system of the electric machine may continue to be operated with limited power. In particular, the change in the flux coupling of coil cores may be limited to those coil cores which carry stator coils with a short circuit or which coil cores are arranged adjacently and carry stator coils with a short circuit.

The magnetic circuit of the stator coil with the turn short circuit may advantageously be changed in such a way that no thermally critical fault current is driven. As a result, the electric machine is configured in a particularly robust and operationally reliable manner, without there being an increased risk of fire or an increased risk of total failure of the electric machine.

In a development of the electric machine, the coil cores each have an end, which is close to the rotor, for generating a magnetic field which extends in the direction of the rotor, that is to say a magnetic field which faces the rotor, that is to say acts on the rotor. Ends of this kind which are close to the rotor are expediently formed by pole shoes of the coil cores. Flux-conducting elements in the form of webs composed of magnetically flux-conducting material which connect the pole shoes to one another may be inserted in a suitable manner between these pole shoes and, for example, in a manner making contact with the pole shoes. In this way, the magnetic flux circuit may be modified particularly easily by the fault device by way of the webs being able to be introduced between the pole shoes by the fault devices in the event of a fault and being able to be kept away from the region that is situated between the pole shoes during normal operation.

In the electric machine, the fault device may be configured to change the flux coupling by way of the fault device connecting ends, which are close to the rotor, of coil cores to one another in a flux-conducting manner and/or completely or partially uncoupling ends, which are remote from the rotor, of coil cores from one another with respect to flux, in particular, weakening a flux-conducting line. Therefore, the coupling of stator coils and rotor magnets may be reduced by way of the ends, which are close to the rotor, of the coil cores being able to be connected to one another in a flux-conducting manner. Alternatively, or additionally, field coupling of stator coils and rotor magnets may be reduced by way of an existing flux-conducting connection of coil cores being interrupted or weakened at the ends, which are remote from the rotor, of the coil cores. In particular, ends, which are remote from the rotor, of stator coils may be connected to one another in a flux-conducting manner in such a way that the stator coils are fitted on teeth, that is to say stator teeth, of a common stator yoke. A stator yoke of this kind connects all coil cores to one another remote from the rotor so as to form a common stator yoke. In the case of a stator yoke of this kind, the magnetic flux between the two coil cores may be interrupted remote from the rotor by way of interruptions in the flux-conducting material being made in the stator yoke remote from the rotor. In the event of a fault, parts of the stator yoke may expediently be pushed out of the stator yoke, so that coil cores are no longer connected to one another in a flux-conducting manner at the rotor-end ends of the coil cores in the event of a fault.

In an advantageous development of the electric machine, the fault device is configured to move at least one flux-conducting element in the direction of a flux-conducting direction of the coil cores and/or in a radial direction with respect to a rotor axis of the rotor. The fault device is configured in a suitable manner to introduce the at least one flux-conducting element radially and/or in the direction of a flux-conducting direction of the coil cores between two pole shoes, e.g., of adjacent coil cores, which are advantageously present in the electric machine and which expediently form ends, which are close to the rotor, of the coil cores. Alternatively, or additionally, flux-conducting elements which connect ends, which are remote from the rotor, of coil cores to one another may advantageously be arranged such that they may be moved radially or in the direction of a flux-conducting direction of the coil cores out of the stator yoke.

In a particular development, the at least one flux-conducting element is configured and arranged to be able to be moved from a position in which the flux-conducting element connects ends, which are remote from the rotor, of coil cores to one another in a flux-conducting manner to a position of the kind in which the flux-conducting element connects ends, which are close to the rotor, of coil cores to one another.

Alternatively, or additionally, the fault device in the electric machine may advantageously be configured to move the flux-conducting element in a direction parallel to a rotor axis of the rotor. In a rotating electric machine, the spatial region which would result from displacement of the stator in the direction parallel to the rotor axis of the rotor is expediently not necessarily functionally occupied, and therefore this development, the fault device, may be implemented particularly easily. In particular, flux-conducting elements may be introduced in this direction between ends, which are close to the rotor, of coil cores and flux-conducting elements may be moved out from a region between ends, which are remote from the rotor, of coil cores when a fault occurs.

Alternatively, or additionally, the flux-conducting element may be moved in the circumferential direction by the fault device. In this development, the fault device is expediently configured to move a large number of flux-conducting elements in the circumferential direction about the rotor axis at the same time, in particular, by a ring-like device which includes the flux-conducting elements.

In the electric machine, the fault device may be configured to change the flux coupling by way of weakening a flux-conducting connection of ends, which are remote from the rotor, of the coil cores to one another.

In a development of the electric machine, the flux-conducting element has a direction-dependent magnetic permeability in the electric machine. In the flux-conducting element, the magnetic permeability is expediently at a maximum in one direction and at a minimum in a direction which runs in an inclined manner, (e.g., transversely), to the one direction. In this way, the position of the flux-conducting element does not necessarily have to be changed in order to change a magnetic flux coupling. Rather, it is sufficient to rotate the flux-conducting element in order to be able to change a change in the flux coupling via a flux line through the flux-conducting element. In this development, the flux conductor element may have a circular design so that the flux-conducting element may be arranged in a rotatable manner within a yoke or between two pole shoes.

In the electric machine, the flux coupling is changed in a suitable manner by way of the flux-conducting element being rotated. This development is particularly advantageous in particular in combination with the abovementioned development.

In an advantageous development, the flux-conducting element has a flux saturability, that is to say a saturability of the magnetic flux, which varies along a spatial direction. A magnetic flux coupling of coil cores may be easily changed by a variable flux saturability of the flux-conducting element.

In the electric machine, the fault device is particularly advantageously configured to change the flux coupling in the event of a fault, such as in the event of an electrical short circuit, (e.g., a turn short circuit), of a stator coil, of the electric machine. In particular, the electric machine may have a sensor for detecting a fault, for example, a current sensor for detecting a short-circuit current and/or an infrared sensor for detecting the start of heat development or another suitable sensor. The fault device may change the flux coupling by the sensor and the associated controller. This may expediently take place actively by a correspondingly designed controller. Alternatively, this may be achieved passively, for example, automatically by using a physical effect which accompanies the fault.

The electric machine may be a permanently excited machine. Alternatively, or additionally, the electric machine may be a motor and/or a generator.

In the electric machine, the fault device may include pyrotechnic material configured to ignite in the event of a fault and to move the flux-conducting element.

In a suitable development of the electric machine, the fault device, as an alternative or in addition, has a spring element which is configured to apply force to and move the flux-conducting element in the event of a fault. In this way, the flux-conducting element may be easily moved to or from specific positions, so that the fault device may easily change the flux coupling of coil cores of stator coils by the flux-conducting elements.

The hybrid-electric aircraft is, in particular, a hybrid-electric airplane. The hybrid-electric aircraft has an electric machine, as described above. The hybrid-electric aircraft expediently includes an electric drive including the electric machine, in particular, in the form of an electric motor. The electric drive may be connected in a driving manner to a propeller of the aircraft.

BRIEF DESCRIPTION OF THE DRAWINGS

The disclosure will be discussed in more detail below based on an exemplary embodiment illustrated in the drawings, in which.

DETAILED DESCRIPTION

Figure 1:
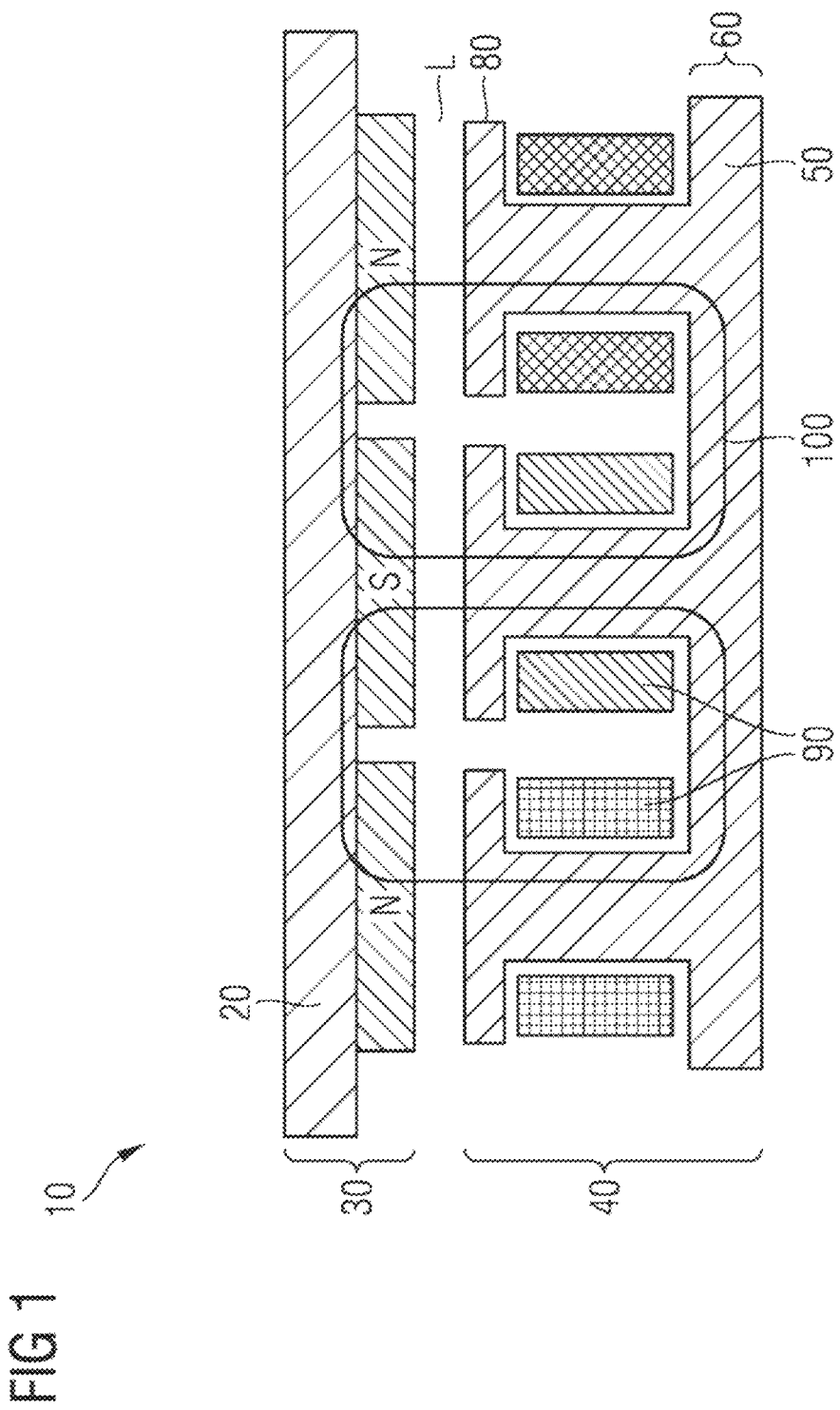
FIG. 1 schematically depicts a cross section through a detail of an embodiment of an electric machine including a stator yoke with tooth-like coil cores and stator coils arranged thereon and a rotor carrying permanent magnets during normal operation.

The electric machine 10, illustrated in a detail in FIG. 1, is an electric motor. In further exemplary embodiments, not illustrated separately, the electric machine 10 may be a generator.

The electric machine 10 includes a circular ring-like rotor yoke 20, from which permanent-magnet poles N, S, which are designed as flat parts, extend radially inward in the form of north poles and south poles. The rotor yoke and permanent-magnet poles N, S form a rotor 30 of the machine 10. A stator 40 of the machine 10 is located within the rotor 30 of the machine 10. The stator 40 of the machine 10 includes a stator yoke 50 formed with a circular ring-like stator ring 60, from which stator teeth 70 of the stator yoke 50 extend radially outward and end in pole shoes 80 of the stator yoke 50. The stator teeth 70 of the stator yoke 50 function as winding carriers and carry windings 90 of the electric machine 10. The windings 90 of the electric machine 10 form stator coils of the electric machine 10. The windings 90 of the electric machine 10 are fitted as insulated copper wire windings to the stator teeth 70 which each surround the stator teeth 70 between the stator ring 60 and pole shoes 80. As a result, the stator teeth 70 form coil cores of the stator coils of the electric machine 10.

By this configuration, a magnetic circuit 100 is implemented during normal operation of the electric machine 10, as illustrated in FIG. 1, in such a way that the stator teeth 70, which carry the windings 90, conduct the magnetic flux radially outward. The magnetic flux is coupled into the permanent-magnet pole S, N of the rotor 30 that faces stator tooth 70 by a magnetic field across an air gap L located between the stator 40 and the rotor 30, is passed there via rotor yoke 20 to adjacent permanent-magnet poles N, S, exits there in each case and is coupled by a magnetic field into the stator teeth 70, which are each close to the permanent-magnet poles N, S, of the stator yoke 50, there is conducted radially inward in relation to the stator ring 60 of the stator yoke 50, where the magnetic circuit 100 is closed via the stator ring 60 of the stator yoke 50.

Figure 2:
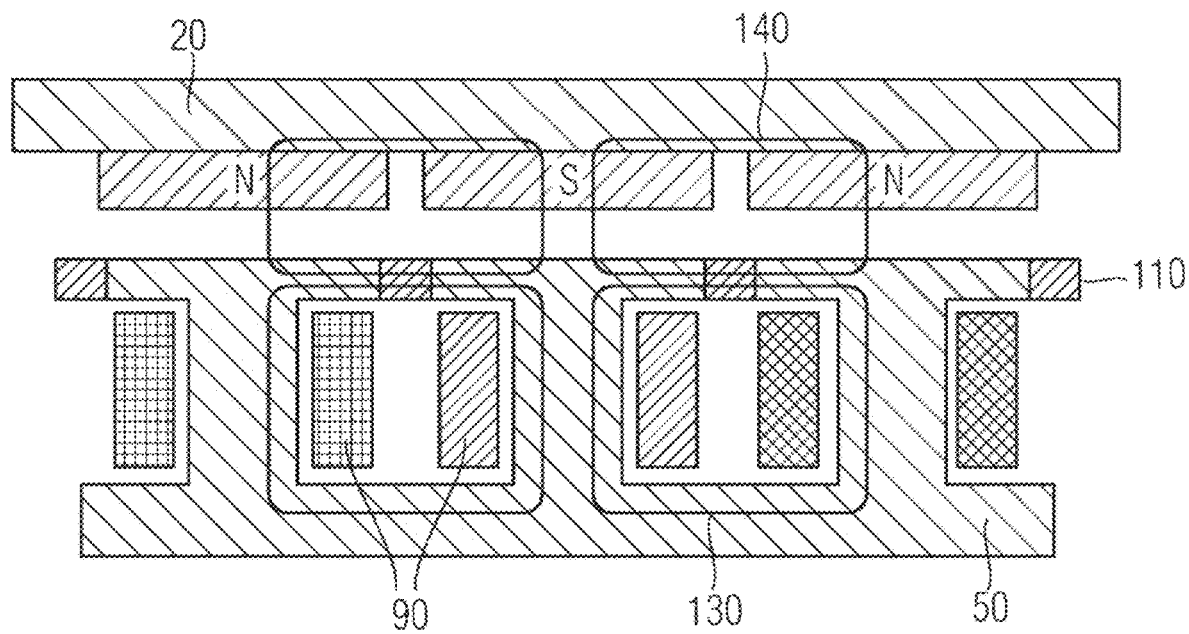
FIG. 2 schematically depicts a cross section through the detail of the electric machine according to FIG. 1 in the event of a fault with flux-conducting elements which are inserted between ends, which are close to the rotor, of the coil cores.
Figure 3:
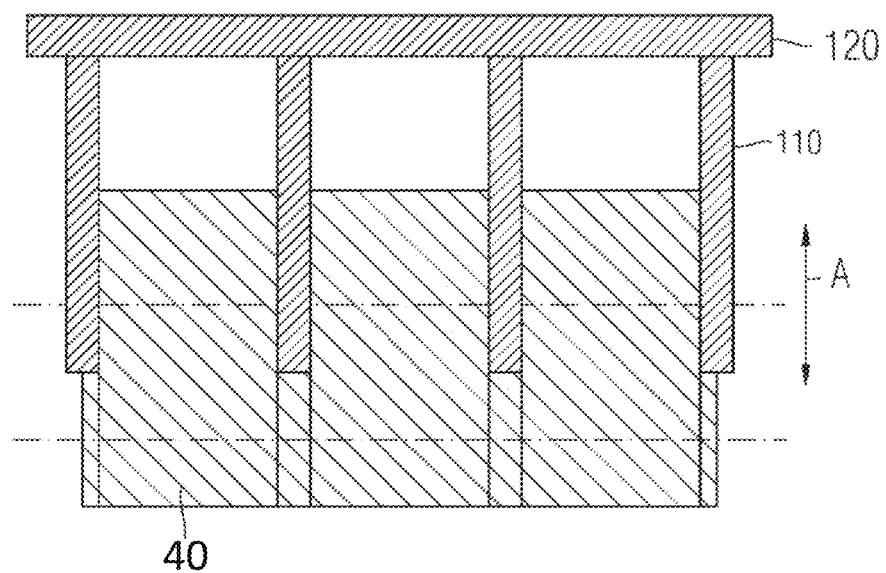
FIG. 3 schematically depicts a plan view of the stator of the electric machine according to FIGS. 1 and 2.

In the event of a fault, as illustrated in FIG. 2, flux-conducting elements 110 in the form of cuboids, which include the same flux-conducting material as the stator yoke 50, are inserted between the pole shoes 80 of the stator teeth 70. In the exemplary embodiment illustrated in FIG. 2, the flux-conducting elements 110 are inserted between the pole shoes 80 of the stator teeth 70 in the axial direction A, that is to say in the direction parallel to a rotation axis of the rotor which runs perpendicular to the plane of the drawing, in this case. The flux-conducting elements 110 are configured and dimensioned in such a way that they come into contact with the pole shoes 80. The cuboidal flux-conducting elements 110 form, as illustrated in FIG. 3, webs which project from a ring-like web ring carrier 120 in the axial direction A and which may be inserted into the stator 40 in the axial direction A together with the web ring carrier 120.

In the event of a fault, the magnetic circuits 130, 140, as illustrated in FIG. 2, take a significantly different course than during normal operation according to FIG. 1. That is, the magnetic flux of the rotor 30 continues to run from the permanent-magnet poles N, S via the magnetic field, which passes through the air gap L between the rotor 30 and the stator 40, to the stator teeth 70 of the stator 40. The flux no longer continues to radially follow the radial extent of the stator teeth 70 inward, but the magnetic flux is deflected in the pole shoes 80 in the direction of the flux-conducting elements 110, via which the magnetic flux passes beyond the flux-conducting element 110 into a respective pole shoe 80 of an adjacent stator tooth 70. From there, the flux travels again across the air gap L, penetrates a permanent-magnet pole N, S, which is close to this stator tooth 70, of the rotor 30 and consequently penetrates the rotor yoke 20. In this way, the magnetic circuits 140 of the rotor 30 are short-circuited by the flux-conducting elements 110, so that the magnetic flux circuits 140 of the rotor 30 may no longer be coupled to a defective winding 90 of the stator 40. As a result, no voltage is induced in the windings 90 of the stator 40 via the rotor 30, so that no fault current results either. However, the magnetic flux, which is now generated by the windings 90 of the stator 40, is now likewise guided via the flux-conducting elements 110 located between the pole shoes 80 of the stator teeth 70, so that this magnetic flux does not enter the permanent-magnet poles N, S of the rotor 30 across the air gap L. As a result of this, the winding inductance increases, so that short-circuit currents are additionally reduced by the inductance. In the illustrated exemplary embodiment, the fault device, not shown in detail, drives the non-faulty windings 90 of the stator 40 in such a way that the magnetic flux of the rest of the windings 90 counteracts any remaining magnetic flux of the rotor 30. For this purpose, the windings 90 are each driven individually, so that the function of the rest of the windings 90 is not influenced.

The flux-conducting elements 110 may be jointly introduced into the stator 40 by the web ring carrier 120. However, as an alternative and not shown in detail, the flux-conducting elements 110 may also be introduced only in pairs in order to decouple only the affected winding 90 of an individual stator tooth 70 in the event of a fault. Therefore, only a portion of the torque of the electric machine 10 is lost in the event of a fault. However, although not specifically shown, it is likewise possible in principle for not only a single pair, but rather a plurality of pairs, to be fitted to the web ring carrier 120. However, a large number of pairs of flux-conducting elements 110 are not necessarily fitted to the web ring carrier 120 in such a way that each winding 90 of the stator 40 may be magnetically decoupled from the rotor 30. In this way, all possible intermediate stages may be set as desired between decoupling and torque transmission of the stator 40 and the rotor 30.

The flux-conducting elements 110 are axially inserted, for example, by a compression spring (not specifically illustrated) of the fault device, which compression spring releases in the event of a fault and applies force to the web ring carrier 120 in the direction of the stator 40.

Figure 4:
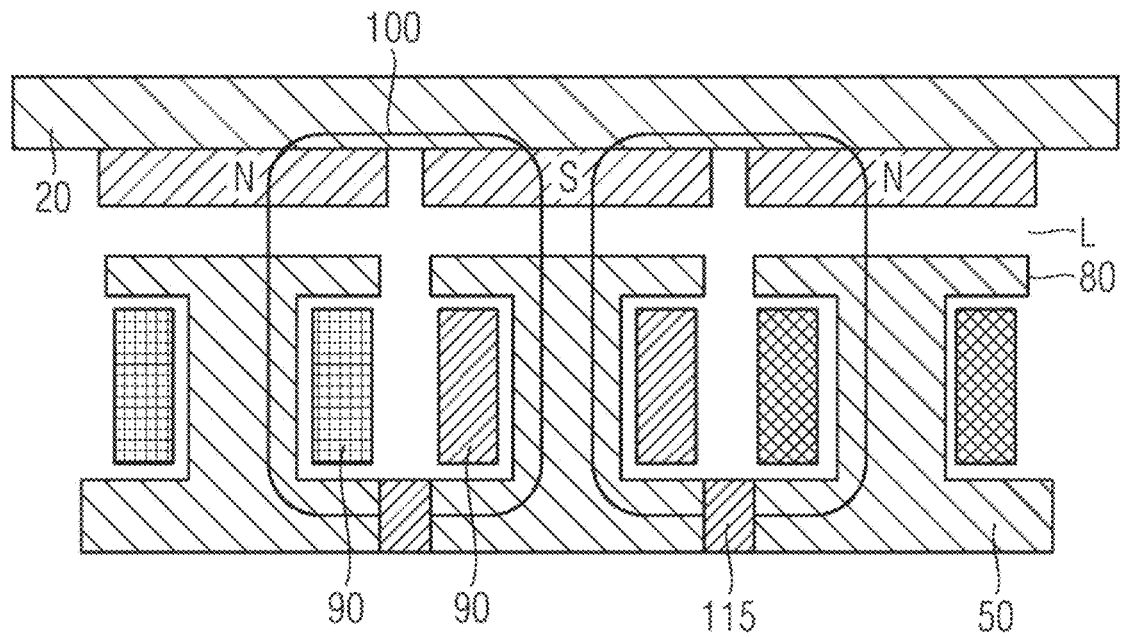
FIG. 4 schematically depicts a cross section through a detail of a further exemplary embodiment of the electric machine with flux-conducting elements which are inserted between ends, which are remote from the rotor, of stator coils during normal operation.
Figure 5:
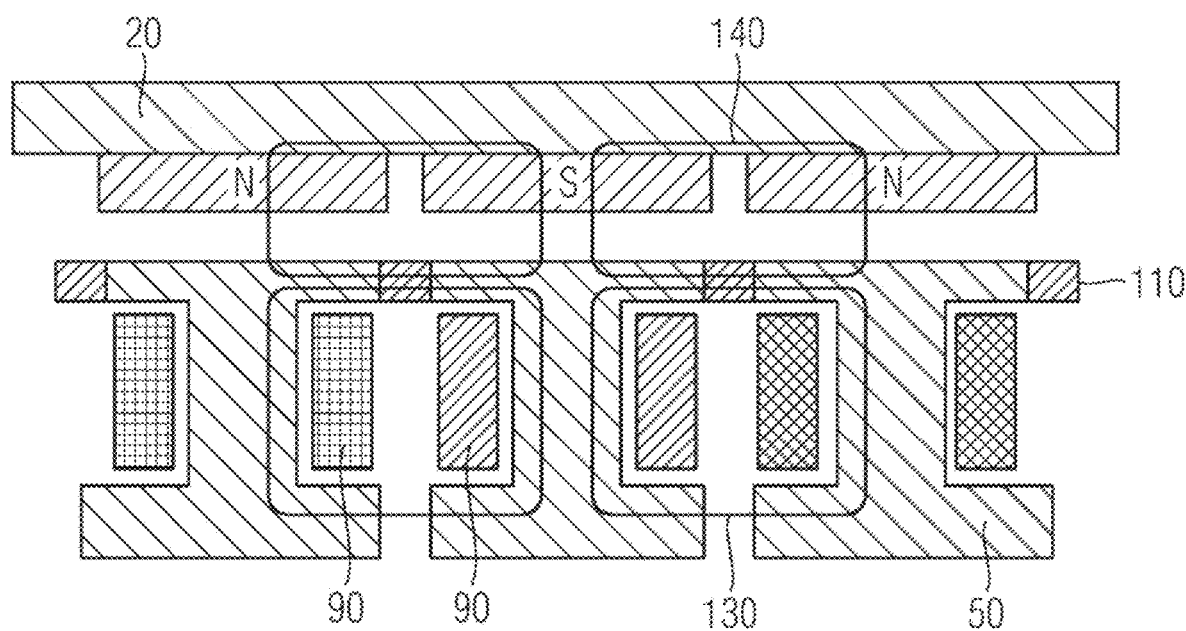
FIG. 5 depicts the detail according to FIG. 4 in the event of a fault, wherein the flux-conducting elements are inserted in a flux-conducting connecting manner between ends, which are close to the rotor, of the coil cores.

The magnetic decoupling may additionally be yet further improved by way of not only pole shoes 80 which form flux-conducting elements 110 being inserted into the regions between the ends, which are close to the rotor, of the stator teeth 70, but rather at the same time the stator yoke 50 being able to have further flux-conducting elements 115, which may be removed from the stator yoke 50. To this end, the stator yoke 50 has, as shown in FIGS. 4 and 5, circumferential sections, which are formed with the flux-conducting elements 115, (e.g., along the circumferential direction of the stator ring 60). Like the flux-conducting elements 110 described above, the flux-conducting elements 115 may be inserted into the stator 40 in the axial direction A, but not in the event of a turn short circuit of the windings 90. Instead, these flux-conducting elements 115 are already introduced in the stator ring 60 of the stator yoke 50 during normal operation. In the event of a fault however, these flux-conducting elements 115 are pushed out of the stator ring 60 in the axial direction A by a further web ring carrier 120, not specifically shown, out of the stator yoke 50. In this way, the guidance of the magnetic flux of the rotor 30 via the pole shoes 80 and the flux-conducting elements 110 located between them is further intensified because the stator ring 60 contains a plurality of additional air gaps in the event of a fault. These air gaps further reducing the magnetic flux which penetrates the stator teeth 70 in the radial direction.

The principle explained with reference to FIGS. 1 to 5 of changing the magnetic circuits 100 which couple the rotor 30 and the stator 40 into, instead, weaker coupling or decoupling magnetic circuits 130, 140 in the event of a fault also remains in the exemplary embodiments explained below. However, in the exemplary embodiments described below, the flux-conducting elements are configured and/or may be moved in a different manner. Otherwise, the illustrated electric machines correspond to the electric machine 10 according to FIGS. 1 to 5.

In the case of the electric machine 500 illustrated in in FIGS. 6 and 7, which otherwise corresponds to the electric machine 10 explained with reference to FIGS. 1 to 5, flux-conducting elements 510 are provided instead of flux-conducting elements 110 which may be moved into the stator 40 in the axial direction A and flux-conducting elements 115 which may be moved out of the stator 40 in the axial direction A, which flux-conducting elements 510 at the same time take over the role of the flux-conducting elements 110 and 115. To this end, the flux-conducting elements 510 of FIGS. 6 and 7 cannot be moved approximately axially by a web ring carrier 120. Rather, the flux-conducting elements 510 are guided such that they may be moved radially with respect to the rotation axis of the rotor 30. To this end, during normal operation, the flux-conducting elements 510 of cuboidal design occupy those sections of the stator ring 60 of the stator yoke 50 which correspond to those sections of the flux-conducting elements 115 of the exemplary embodiments illustrated in FIGS. 4 and 5 during normal operation (also referred to below as flux-conducting element position which is remote from the rotor). During normal operation, the flux-conducting elements 510 therefore strengthen the magnetic flux of the magnetic circuits 100 which couple the stator 40 and the rotor 30. In the event of a fault, the flux-conducting elements 510 are arranged such that they may be moved outward in the radial direction, that is to say in direction R in FIGS. 6 and 7, until the flux-conducting elements 510 between the pole shoes 80 come into contact with the pole shoes (also referred to below as flux-conducting element position which is close to the rotor). In this way, as in the exemplary embodiments explained with reference to FIGS. 1 to 5, the magnetic circuits 100 which couple the rotor 30 and the stator 40 may be changed over into weaker coupling or decoupling magnetic circuits 130, 140 in the event of a fault. As is already the case in the exemplary embodiments explained above, the fault device (not specifically shown) is provided with a compression spring which applies force to the flux-conducting elements 510 in the event of a fault so that they move from the flux-conducting element position remote from the rotor to the flux-conducting element position close to the rotor.

Figure 6:
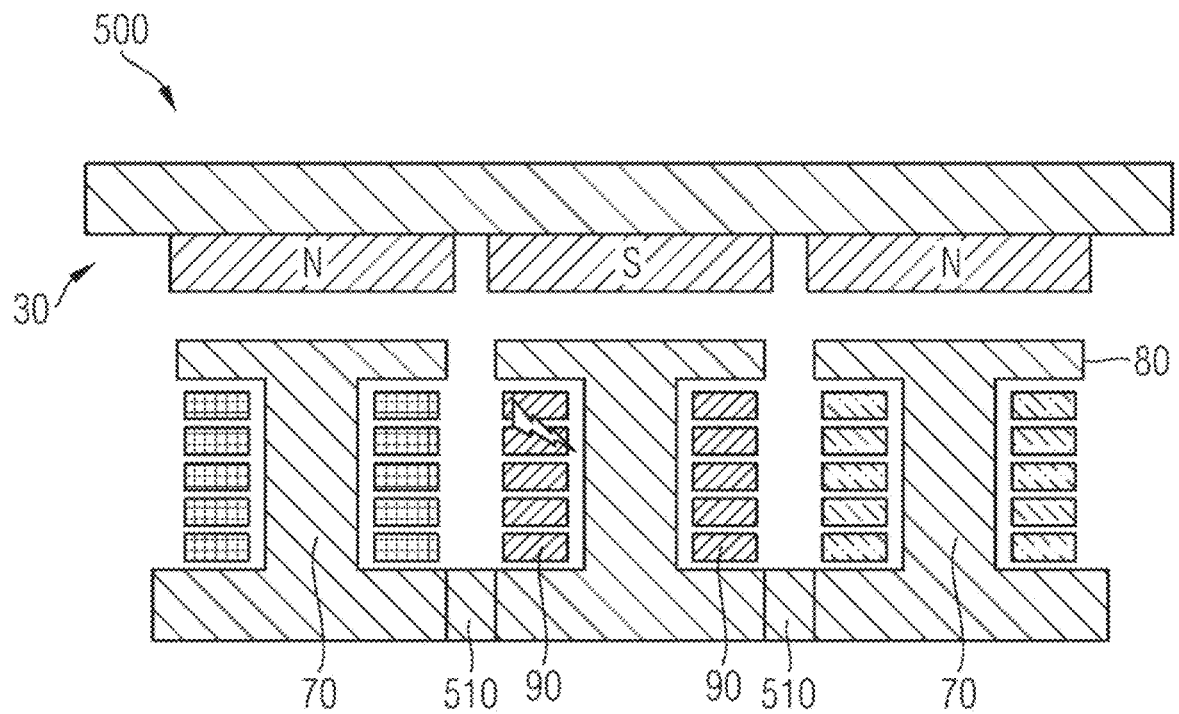
FIG. 6 schematically depicts a cross section through a detail of a further exemplary embodiment of an electric machine during normal operation.
Figure 7:
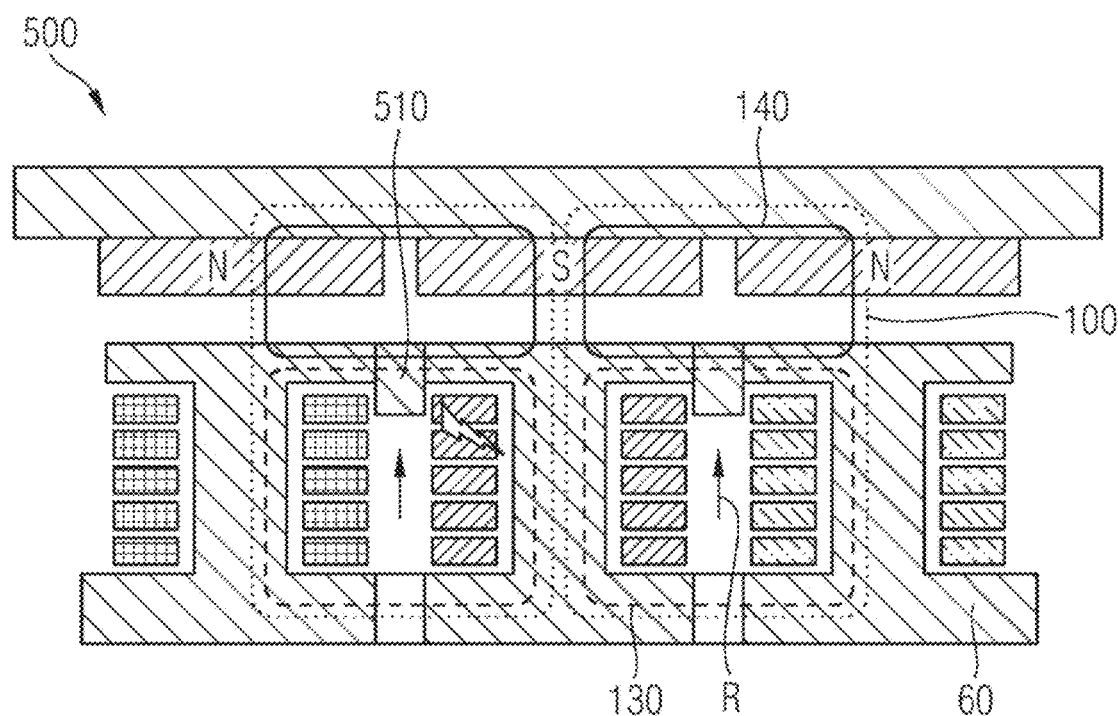
FIG. 7 schematically depicts a cross section through the detail according to FIG. 6 in the event of a fault, in which the flux-conducting elements are moved from a position in which the ends, which are remote from the rotor, of the coil cores are connected to a position in which the ends, which are close to the rotor, of the coil cores are connected in a flux-conducting manner.
Figure 8:
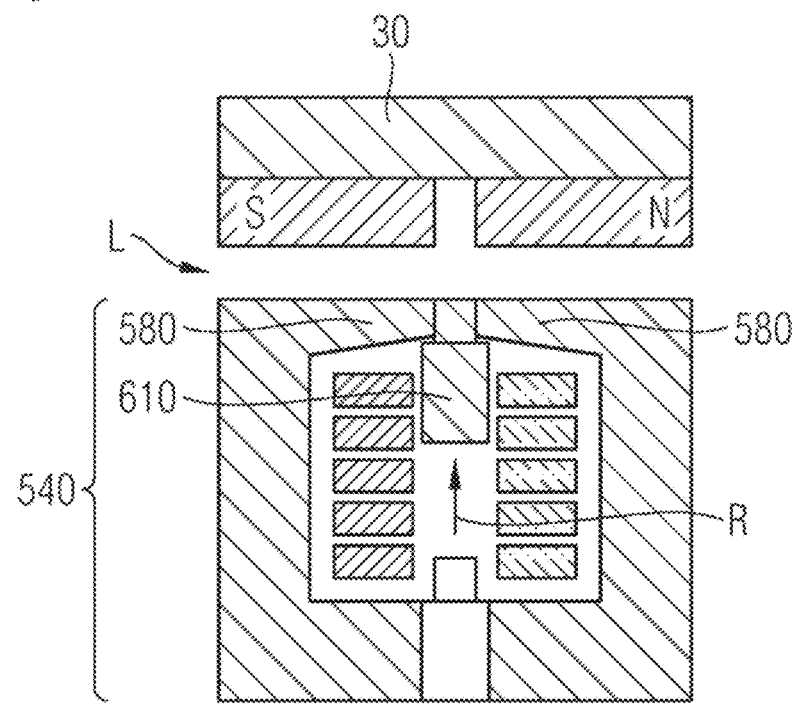
FIG. 8 schematically depicts a cross section through a detail of a further exemplary embodiment of the electric machine including a flux-conducting element, which is shaped in an adapted manner, in the event of a fault.

In a modification of the exemplary embodiment illustrated in FIGS. 6 and 7, flux-conducting elements 610 may have a shape which differs from that of a mathematical cylinder, (e.g., a shape which tapers in the direction of the rotor 30 in the radial direction R, as shown in FIG. 8). A shape of this kind may be formed, for example, by a wider collar which is located on that side of the flux-conducting element 610, which is remote from the rotor and projects perpendicularly to the radial direction R. As shown in FIG. 8, pole shoes 580 which are adjacent to one another are provided with a shape which corresponds to the flux-conducting element 510 in this exemplary embodiment. This effectively prevents the flux-conducting element from being able to enter the air gap L between the rotor 30 and the stator 540 and, for example, destroying the rotor 30.

Figure 9:
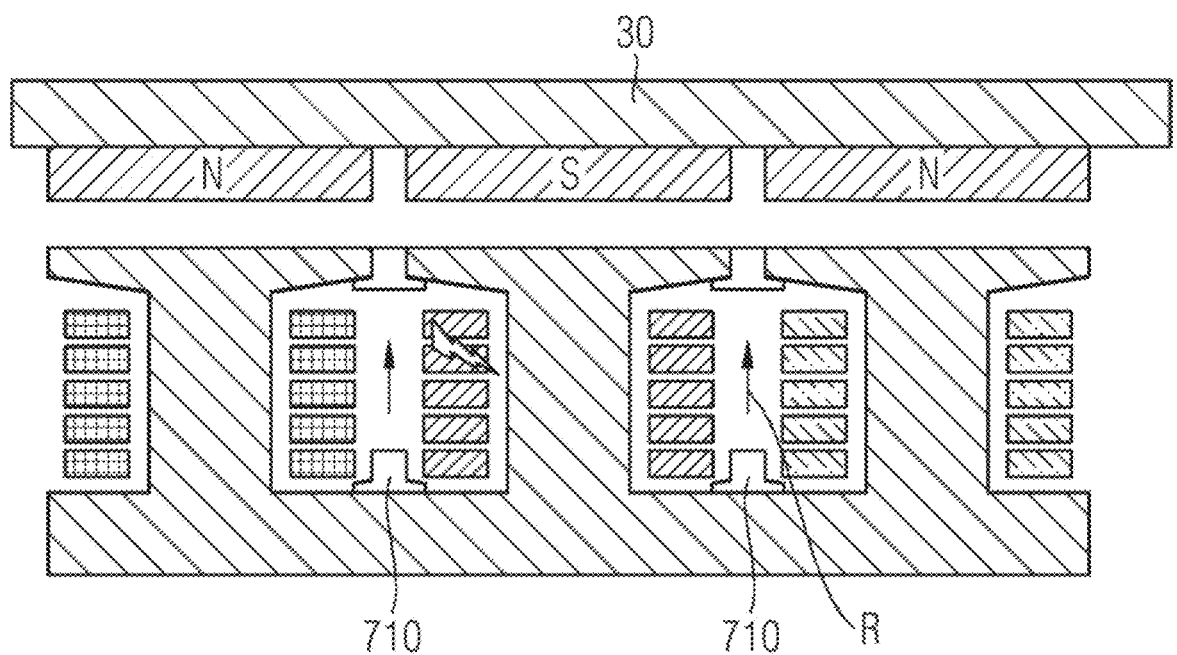
FIG. 9 schematically depicts a cross section through a detail of a further exemplary embodiment of the electric machine including a flux-conducting element which is shaped in an adapted manner, FIG. 10 schematically depicts a cross section through a detail of a further exemplary embodiment of an electric machine including flux-conducting elements with direction-dependent magnetic conductivity during normal operation.

In a modification, illustrated in FIG. 9, of this exemplary embodiment, the flux-conducting elements 710 are not integrated into the stator yoke 50 during normal operation, but rather the flux-conducting elements 710 lie on the stator yoke 50 instead.

Figure 10:
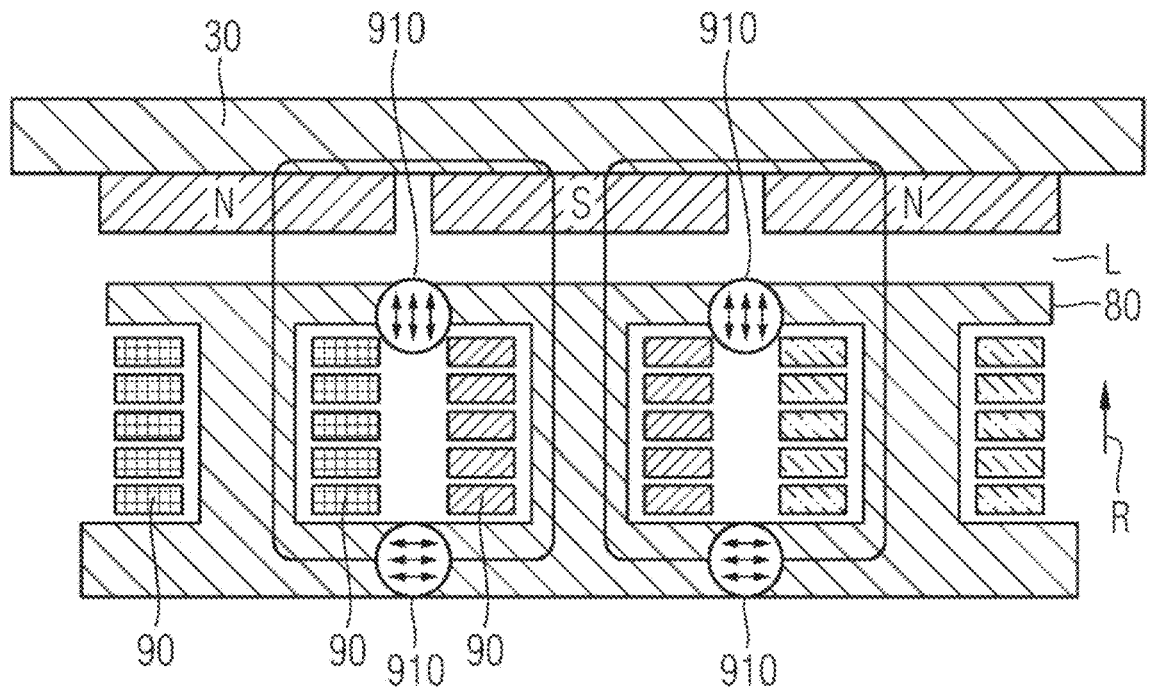

The flux-conducting elements may (as shown in FIG. 10) be configured to be movable not only with respect to the position thereof, but rather the flux-conducting elements 910 may also be configured to be rotatable in principle. The flux-conducting elements 910 according to FIG. 10 are configured with direction-dependent magnetic permeability. In other words, the flux-conducting elements 910 are configured to conduct flux in one spatial direction, but the flux-conducting elements 910 do not have a flux-conducting action in a direction which is perpendicular to the spatial direction. As illustrated in FIG. 10, the flux-conducting elements are integrated into the stator 40 in such a way that the flux-conducting elements 910 are oriented with their flux-conducting direction perpendicular to the radial direction R and therefore are integrated into the stator yoke 50 in a flux-conducting manner in a flux-conducting element position which is remote from the rotor during normal operation. During normal operation, flux-conducting elements 910 are additionally each arranged in a flux-conducting element position which is close to the rotor, wherein their flux-conducting direction is oriented in a radial direction R with respect to a rotation axis of the rotor 30, so that the flux-conducting elements 910 do not have a flux-conducting action during normal operation. Therefore, the pole shoes 80 are not coupled in a flux-conducting manner during normal operation. Consequently, the situation illustrated in FIG. 10 corresponds in magnetic terms to the configuration depicted in FIG. 4.

In the event of a fault, the flux-conducting elements 910 are rotated through 90°, that is to say through a quarter-turn, both in their flux-conducting element position close to the rotor and in their flux-conducting element position remote from the rotor. Consequently, in the event of a fault, the flux-conducting elements 910 act in a flux-conducting manner in the flux-conducting element position close to the rotor and the flux-conducting elements no longer act in a flux-conducting manner in the flux-conducting element position remote from the rotor in the event of a fault. Therefore, the situation illustrated in FIG. 11 now corresponds in magnetic terms to the situation illustrated in FIG. 5. Consequently, the windings 90 are also magnetically decoupled from the rotor 30 in the event of a fault in the situation illustrated in FIG. 11.

Figure 11:
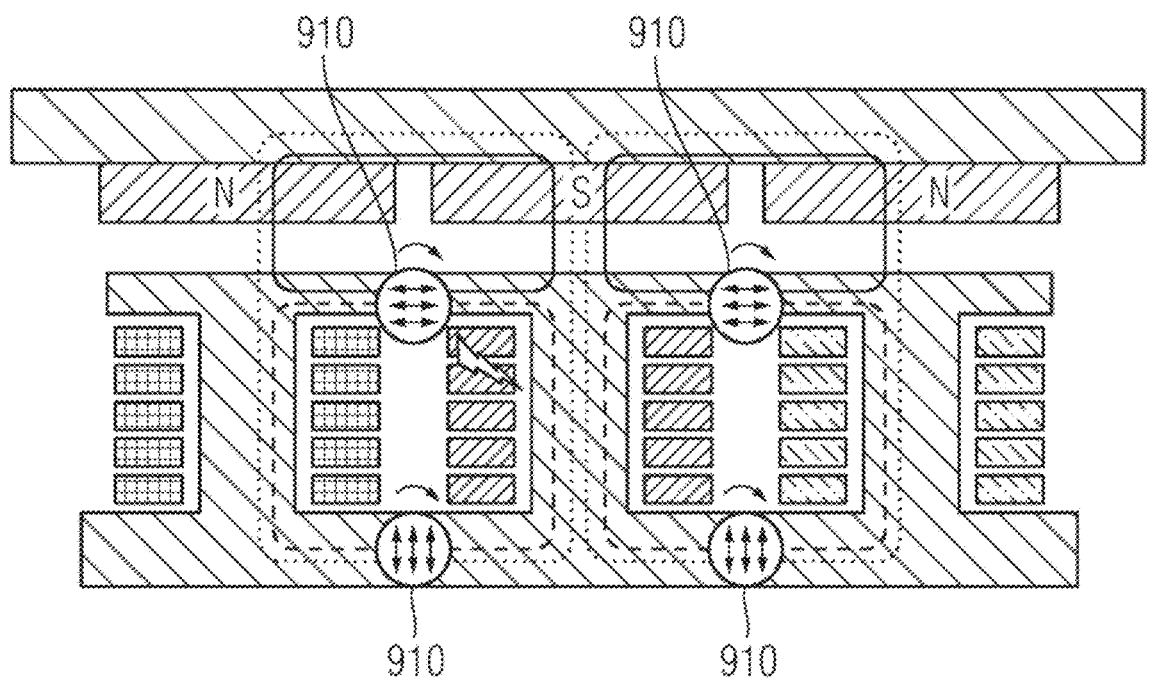
FIG. 11 schematically depicts a cross section through the detail according to FIG. 10 in the event of a fault.
Figure 12:
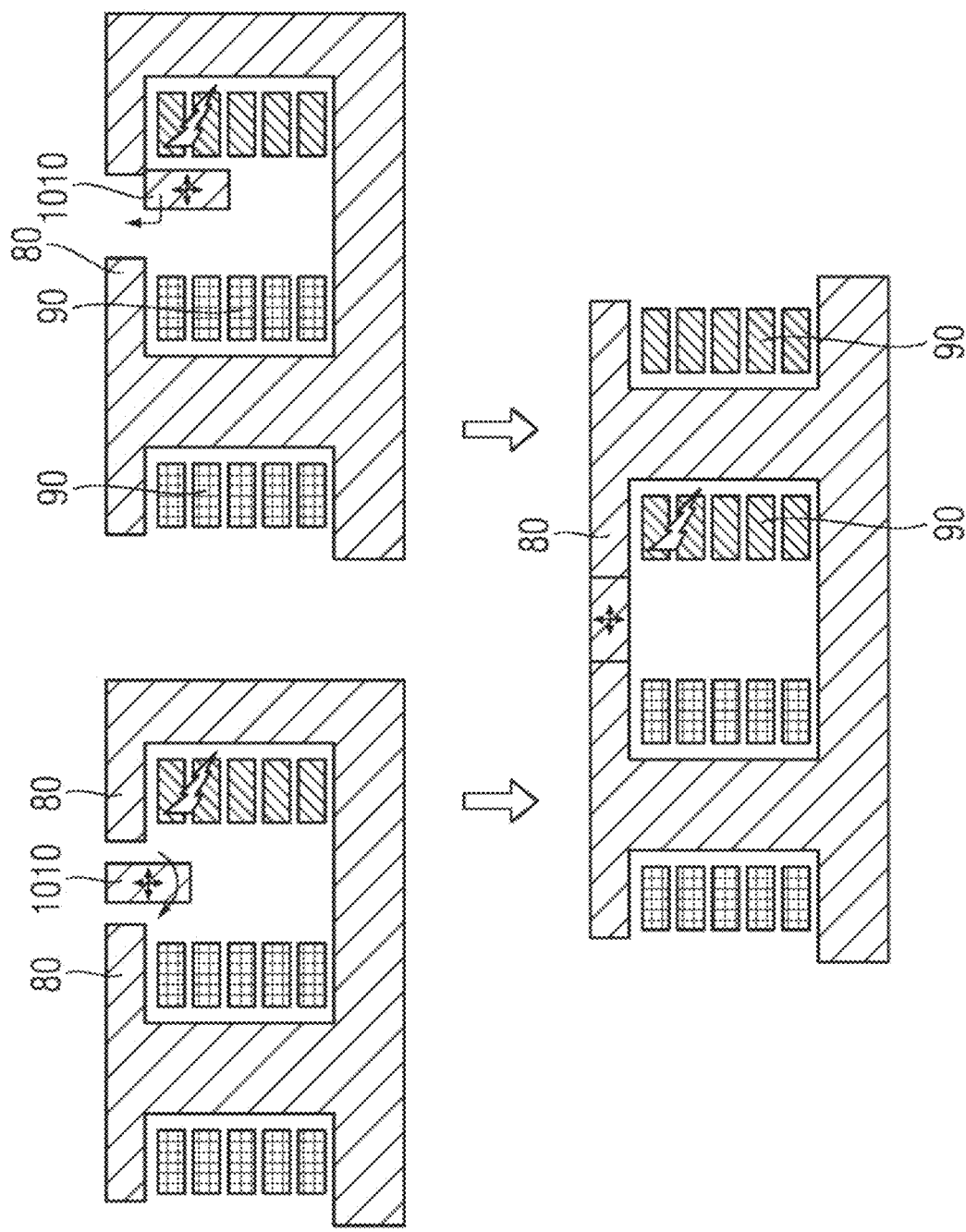
FIG. 12 schematically depicts a cross section through details of further exemplary embodiments of electric machines including flux-conducting elements with direction-dependent magnetic conductivity.

In the exemplary embodiment illustrated in FIGS. 10 and 11, the flux-conducting elements 910 are illustrated in a circular manner, so that rotation of the flux-conducting elements 910 has an effect only with respect to the magnetic configuration but not with respect to the geometric configuration of the stator 40. However, in principle, flux-conducting elements 1010 may also be of cuboidal design in these developments. As shown in FIG. 12, the flux-conducting elements 1010 may be arranged such that they may rotate about a point located between the pole shoes 80 (top left in FIG. 12) or else may be mounted such that they may be pivoted into a position situated between the pole shoes 80 (top right in FIG. 12). In both designs, the flux-conducting elements 1010 are in contact with the pole shoes 80 in the event of a fault.

Figure 13:
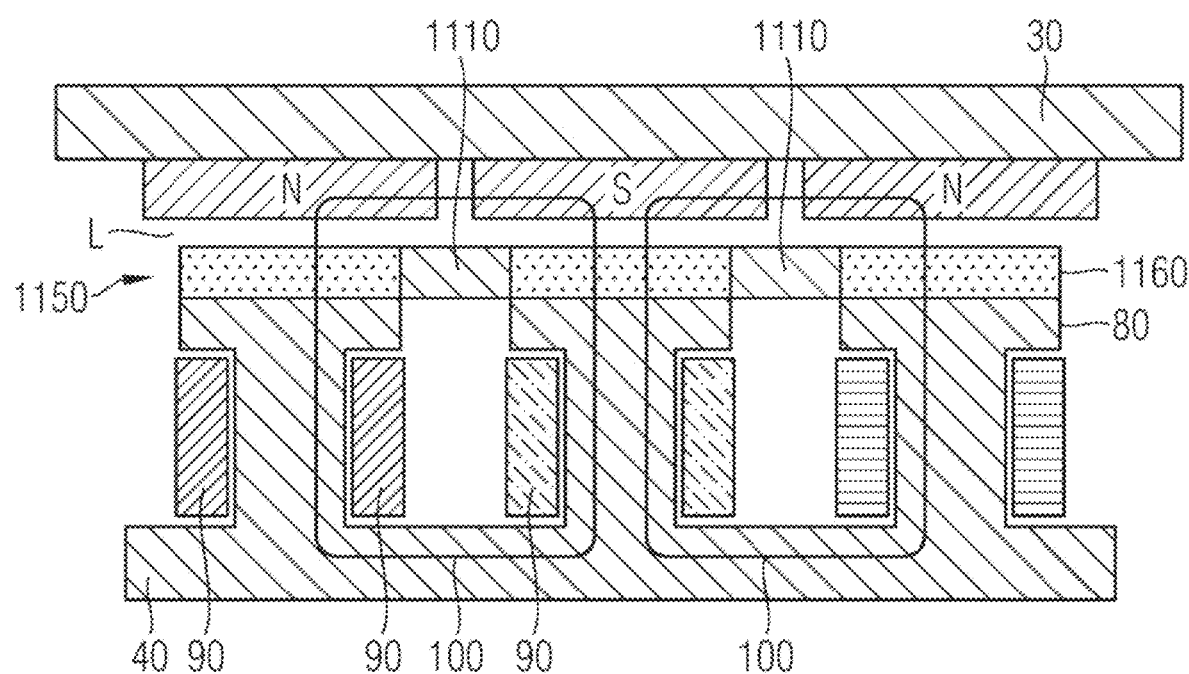
FIG. 13 schematically depicts a cross section through a detail of a further exemplary embodiment of an electric machine including flux-conducting elements, which may be moved in the circumferential direction about an axis of rotation of the rotor, during normal operation.
Figure 14:
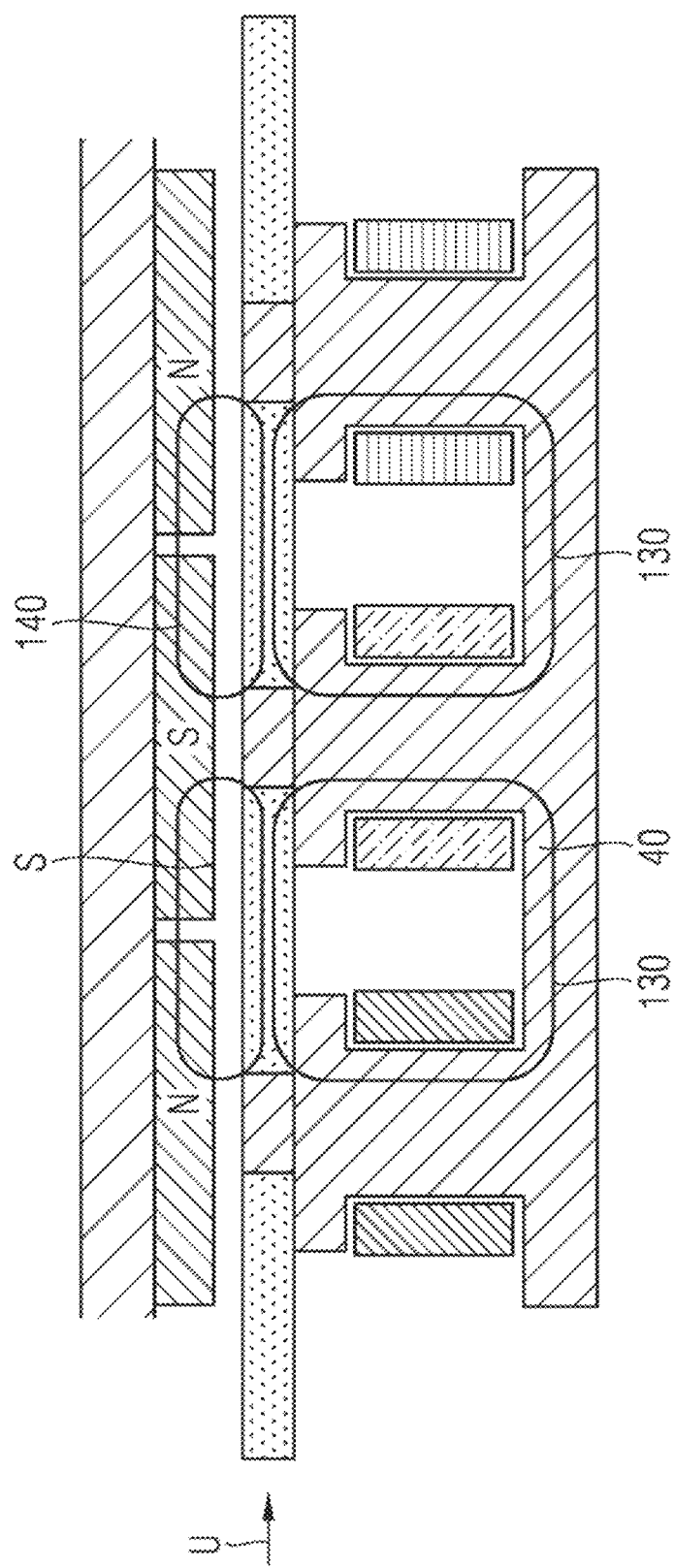
FIG. 14 schematically depicts a cross section through the detail according to FIG. 13 in the event of a fault.

As illustrated in FIGS. 13 and 14, flux-conducting elements 1110 may also be movable in the circumferential direction. Therefore, as illustrated in FIG. 13, the flux-conducting elements are formed with a flux-conducting element ring 1150 which surrounds the pole shoes 80 of the stator 40 in a manner rotatable about a rotation axis of the rotor 30 and makes contact with the pole shoes. The flux-conducting element ring 1150 therefore contacts the radially outer side of the stator 40 close to the rotor. The flux-conducting element ring 1150 includes circumferential sections formed from flux-conducting material, so that these sections form flux-conducting elements 1110. The flux-conducting element ring 1150 additionally has sections 1160 composed of non-flux-conducting material lying in the circumferential direction U between the flux-conducting elements 1110.

The flux-conducting elements 1110 are dimensioned in the circumferential direction in such a way that the flux-conducting elements 1110 terminate precisely with the pole shoes 80 of the stator 40 in the radial direction during normal operation. Consequently, the flux-conducting elements 1110 form only a radial extension of the pole shoes 80 in magnetic terms during normal operation. The magnetic circuits 100 are therefore formed analogously to the arrangement illustrated in FIG. 1 in this case.

However, in the event of a fault, the flux-conducting element ring 1150 may be rotated to a rotary position such that the flux-conducting elements 1110 may bridge the intermediate space located between the pole shoes 80 in the circumferential direction. Consequently, the flux-conducting elements 1110, as illustrated in FIG. 14, form a flux-conducting connection between the pole shoes 80 and therefore a flux-conducting connection between the stator teeth 70. In this case, the arrangement of the flux-conducting elements 1110 is consequently comparable to the arrangement according to FIG. 2 in magnetic terms, and therefore two magnetic circuits 130, 140 which are short-circuited via the pole shoes 80 and the flux-conducting elements 1110 are formed.

Figure 15:
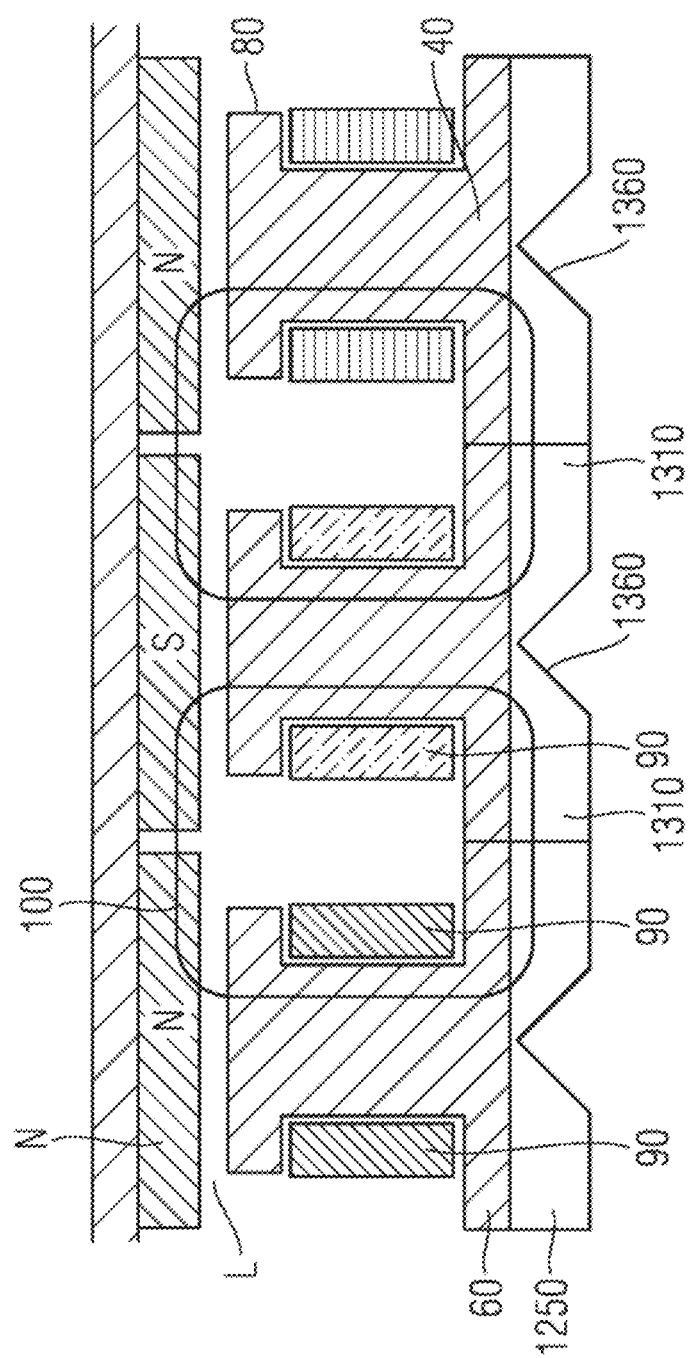
FIG. 15 schematically depicts a cross section through a detail of a further exemplary embodiment of an electric machine including flux-conducting elements, which may move in the circumferential direction, during normal operation.
Figure 16:
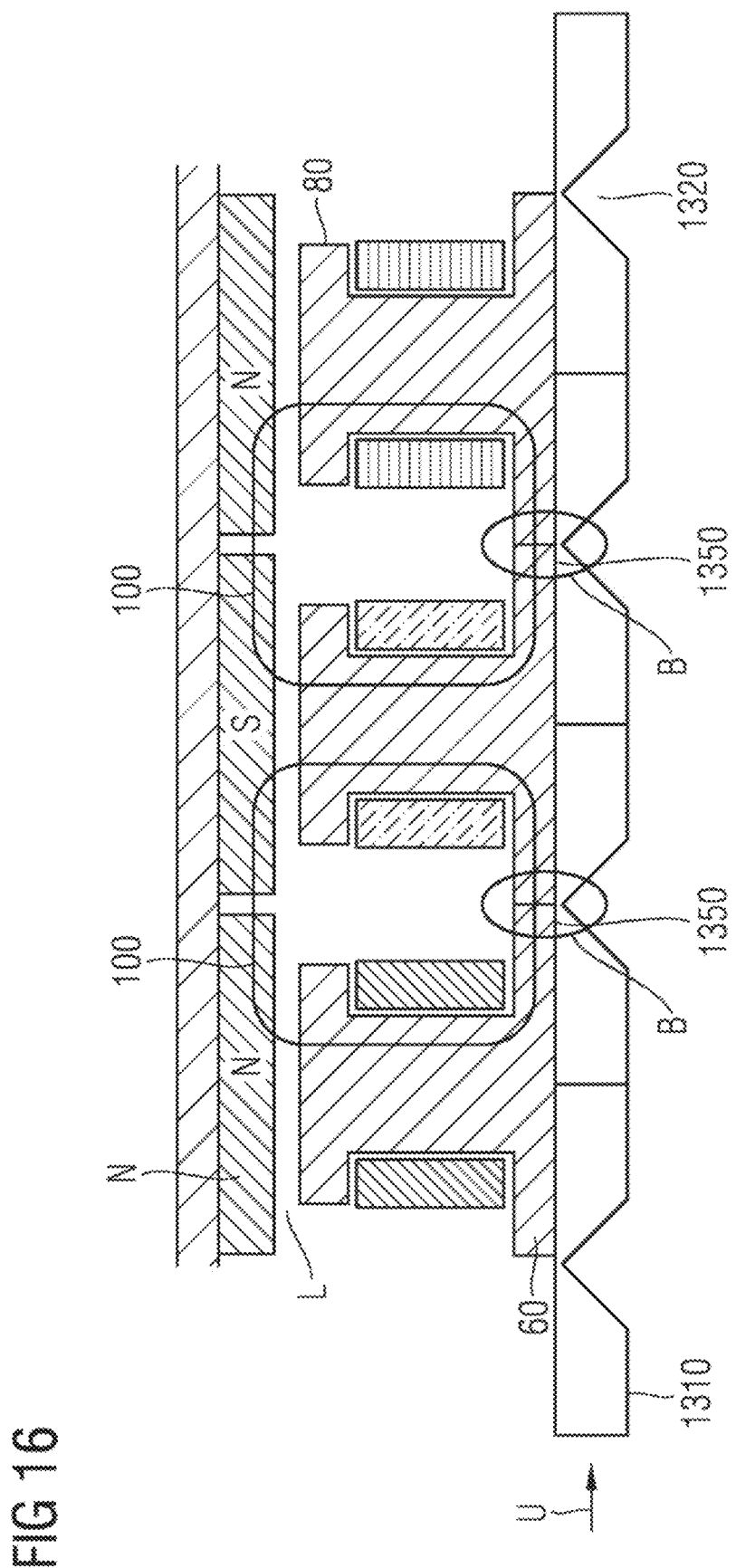
FIG. 16 schematically depicts a cross section through the detail according to FIG. 15 in the event of a fault.
Figure 17:
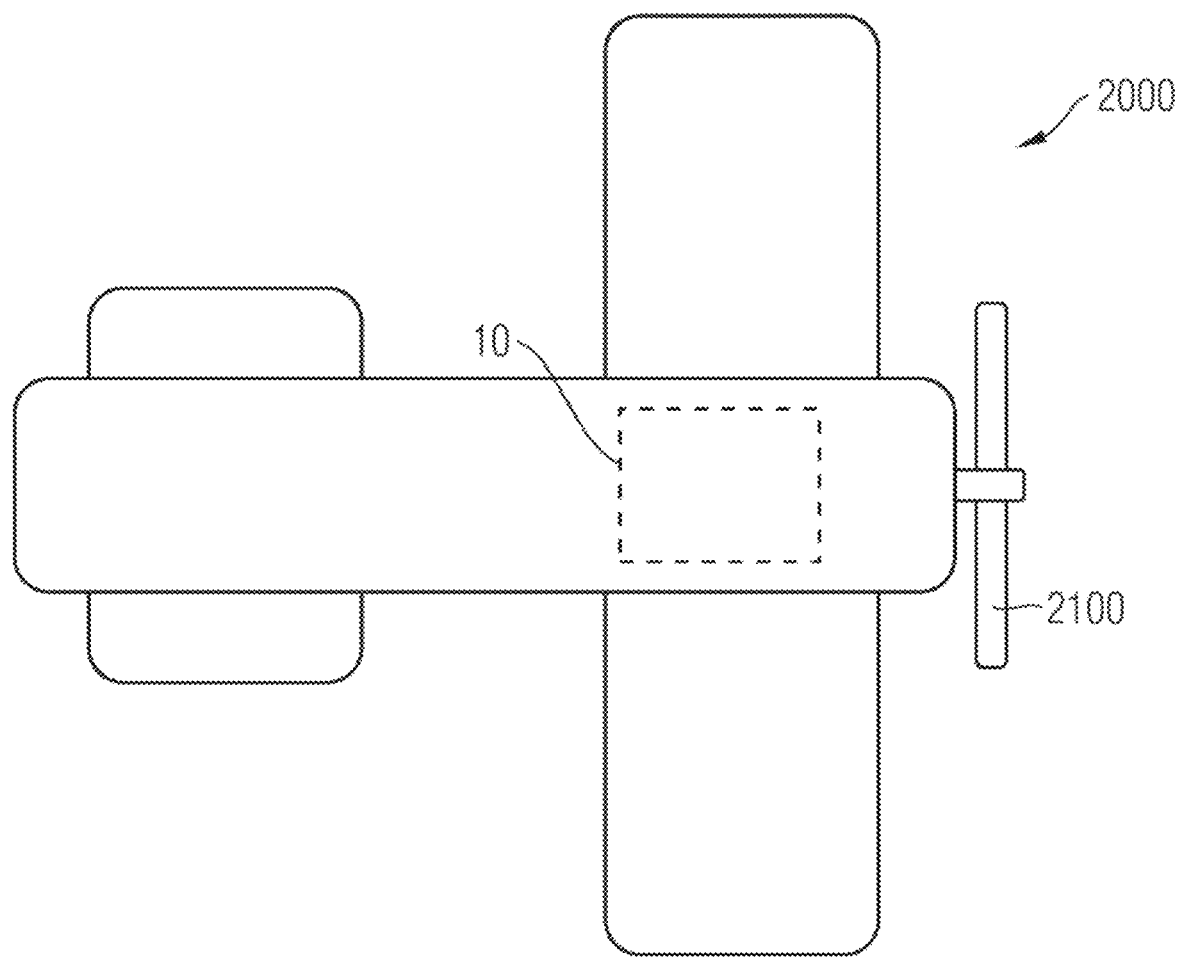
FIG. 17 schematically depicts a basic diagram of a hybrid-electric airplane.

In the exemplary embodiment illustrated in FIGS. 15 and 16, a second flux-conducting element ring 1250 is arranged on that side of the stator 40 that is remote from the rotor instead of the flux-conducting element ring 1150 according to FIGS. 13 and 14 on the inner circumferential side of the stator 40 that is remote from the rotor instead. The second flux-conducting element ring has flux-conducting elements 1310 in the form of circumferential sections formed with the magnetically flux-conducting material. Less efficient flux-conducting sections 1360 are located lying between these flux-conducting elements 1310, the sections being formed from the same material as the flux-conducting elements 1310, however. The less efficient flux-conducting property of the sections 1360 is based on the geometric design of the sections 1360. The sections 1360 are formed by notches cut into the flux-conducting element ring 1250 radially from the inside. Therefore, the sections 1360 are configured to be less thick than the flux-conducting elements 1310 on average in the radial direction. Therefore, the sections 1360 in the regions B saturate at considerably lower magnetic fluxes than the flux-conducting elements 1310.

During normal operation, the flux-conducting elements contact those regions of the stator ring 60 which connect the stator teeth 70 to one another in a flux-conducting manner. Consequently, the configuration illustrated in FIG. 15 constitutes, in magnetic terms, an arrangement which is comparable to that in FIG. 1. Accordingly, a magnetic circuit 100 which couples the windings 90 and the rotor 30 to one another is formed.

However, in the event of a fault, the flux-conducting element ring 1250 may be rotated in the circumferential direction U in relation to the stator 40 in such a way that the less efficient flux-conducting sections 1360 come to lie between the stator teeth 70 in the circumferential direction U. In this way, the flux-conducting connection of the stator teeth 70 to one another is weakened on account of the quicker saturability of the sections 1360. Therefore, the field coupling of the magnetic circuit 100 is reduced and the magnetic coupling of the windings 90 and of the stator 40 to one another is reduced.

The hybrid electric airplane 2000 has an electric machine 10 in the form of an electric motor as described above. For the purpose of driving a propeller 2100, the electric machine is connected in a driving manner to the propeller. In principle, instead of the electric machine 10, an electric machine 10, 500 according to any of the above-described exemplary embodiments may be provided in the hybrid-electric airplane 2000.

Although the disclosure has been described and illustrated more specifically in detail by the exemplary embodiments, the disclosure is not restricted by the disclosed examples and other variations may be derived therefrom by a person skilled in the art without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An electric machine comprising:
a rotor;
a stator having stator coils, wherein each stator coil has a coil core positioned between a stator ring and pole shoes of the stator; and
a fault device configured to change a magnetic flux coupling of coil cores to one another by at least one flux-conducting element,
wherein the fault device is configured to move the at least one flux-conducting element in a radial direction with respect to a rotor axis of the rotor between a first position remote from the rotor and a second position close to the rotor and change the magnetic flux coupling,
wherein, in the first position, the at least one flux-conducting element is positioned between and in contact with respective sections of the stator ring of the stator remote from the rotor,
wherein, in the second position, the at least one flux-conducting element is uncoupled from the respective sections of the stator ring remote from the rotor and instead positioned between and in contact with respective pole shoes of the stator close to the rotor, and
wherein the at least one flux-conducting element provides a weakened flux-conducting connection in the second position relative to the first position.

2. The electric machine of claim 1, wherein each coil core of the stator coils has close to the rotor for generating a field which extends in a direction of the rotor.

3. The electric machine of claim 1, wherein the at least one flux-conducting element has a direction-dependent magnetic permeability.

4. The electric machine of claim 1, wherein the electric machine is a permanently excited machine, a motor, a generator, or a combination thereof.

5. The electric machine of claim 1, wherein the fault device has a spring element configured to move the at least one flux-conducting element in event of a fault.

6. The electric machine of claim 1, wherein the fault device comprises pyrotechnic material configured to ignite in event of a fault and to move the at least one flux-conducting element.

7. The electric machine of claim 1, wherein the fault device is configured to change the magnetic flux coupling in event of a fault or an electrical short circuit of the electric machine.

8. The electric machine of claim 7, wherein the electrical short circuit is a winding short circuit of a stator coil of the stator coils.

9. The electric machine of claim 1, wherein the at least one flux-conducting element has a flux saturability which varies along a spatial direction.

10. The electric machine of claim 9, wherein the flux saturability varies along the spatial direction via constrictions that project out of the at least one flux-conducting element perpendicularly to the spatial direction.

11. The electric machine of claim 10, wherein the constrictions are notches.

12. A hybrid-electric aircraft comprising:
an electric drive comprising an electric machine having:
   a rotor;
   a stator having stator coils, wherein each stator coil has a coil core; and
   a fault device configured to change a magnetic flux coupling of coil cores to one another by at least one flux-conducting element,
   wherein the fault device is configured to move the at least one flux-conducting element in a radial direction with respect to a rotor axis of the rotor between a first position remote from the rotor and a second position close to the rotor and change the magnetic flux coupling,
   wherein, in the first position, the at least one flux-conducting element is positioned between and in contact with respective sections of the stator ring of the stator remote from the rotor,
   wherein, in the second position, the at least one flux-conducting element is uncoupled from the respective sections of the stator ring remote from the rotor and instead positioned between and in contact with respective pole shoes of the stator close to the rotor, and
   wherein the at least one flux-conducting element provides a weakened flux-conducting connection in the second position relative to the first position.

13. The hybrid-electric aircraft of claim 12, wherein the hybrid-electric aircraft is an airplane.

14. The hybrid-electric aircraft of claim 12, further comprising:
   a propeller,
   wherein the electric drive is connected in a driving manner to the propeller.

* * * * *